United States Patent
Ono et al.

(10) Patent No.: US 7,614,801 B2
(45) Date of Patent: Nov. 10, 2009

(54) OPTICAL AXIS ADJUSTING METHOD, OPTICAL MODULE PRODUCING METHOD, OPTICAL AXIS ADJUSTING APPARATUS, AND OPTICAL MODULE

(75) Inventors: Haruyoshi Ono, Yamanashi (JP); Hidemitsu Sugawara, Hyogo (JP)

(73) Assignee: Eudyna Devices Inc., Yamanashi (JP)

( * ) Notice: Subject to any disclaimer, the term of this patent is extended or adjusted under 35 U.S.C. 154(b) by 0 days.

(21) Appl. No.: 11/984,739

(22) Filed: Nov. 21, 2007

(65) Prior Publication Data

US 2008/0232747 A1    Sep. 25, 2008

Related U.S. Application Data

(62) Division of application No. 10/895,988, filed on Jul. 22, 2004, now Pat. No. 7,316,510.

(30) Foreign Application Priority Data

Jul. 23, 2003    (JP)    .............................. 2003-200649

(51) Int. Cl.
  G02B 6/36    (2006.01)
  G02B 6/26    (2006.01)
(52) U.S. Cl. .......................................... 385/93; 385/52
(58) Field of Classification Search ................... 385/52, 385/93
  See application file for complete search history.

(56) References Cited

U.S. PATENT DOCUMENTS

| | | | | |
|---|---|---|---|---|
| 4,827,098 A | * | 5/1989 | Kasner et al. | .......... 219/121.63 |
| 5,195,155 A | * | 3/1993 | Shimaoka et al. | ............. 385/90 |
| 5,537,503 A | * | 7/1996 | Tojo et al. | ..................... 385/93 |
| 5,656,185 A | * | 8/1997 | Findlan et al. | ......... 219/121.64 |
| 6,343,166 B1 | * | 1/2002 | Hellman et al. | ................ 385/31 |
| 6,582,135 B2 | * | 6/2003 | Brun et al. | ..................... 385/78 |
| 6,667,997 B2 | * | 12/2003 | Nasu et al. | ..................... 372/32 |
| 6,715,929 B2 | | 4/2004 | Watanabe et al. | |
| 6,767,322 B1 | * | 7/2004 | Futatsugi et al. | ............ 600/133 |
| 6,881,925 B1 | * | 4/2005 | Sato et al. | .............. 219/121.73 |
| 6,960,026 B2 | * | 11/2005 | Brun et al. | ..................... 385/78 |

(Continued)

FOREIGN PATENT DOCUMENTS

JP    63-163416    7/1988

(Continued)

OTHER PUBLICATIONS

Japanese Office Action dated Sep. 5, 2006 (mailing dated), issued with corresponding Japanese Patent Application No. 2003-200649.

*Primary Examiner*—K. C. Kianni
(74) *Attorney, Agent, or Firm*—Westerman, Hattori, Daniels & Adrian, L.L.P.

(57) ABSTRACT

An optical axis adjusting method for adjusting a tilt angle of an optical axis in two regions optically coupled in a holding member includes the steps of: roughly adjusting the optical axis by irradiating a first region on the holding member with a laser beam; and finely adjusting the optical axis by irradiating a second region on the holding member with a laser beam. One of the two regions is set as a reference point. The first region is located closer to the reference point, while the second region is located further from the reference point.

12 Claims, 14 Drawing Sheets

U.S. PATENT DOCUMENTS

| | | | |
|---|---|---|---|
| 7,187,826 B2 * | 3/2007 | Brun et al. | 385/31 |
| 7,385,157 B2 * | 6/2008 | Oda et al. | 219/121.63 |
| 2002/0081066 A1 * | 6/2002 | Brun et al. | 385/34 |
| 2002/0081067 A1 * | 6/2002 | Brun et al. | 385/34 |
| 2002/0094172 A1 * | 7/2002 | Brun et al. | 385/78 |
| 2002/0106155 A1 * | 8/2002 | Brun et al. | 385/34 |
| 2002/0110322 A1 * | 8/2002 | Brun et al. | 385/33 |
| 2002/0118929 A1 * | 8/2002 | Brun et al. | 385/84 |
| 2002/0126717 A1 * | 9/2002 | Nasu et al. | 372/32 |
| 2003/0152337 A1 * | 8/2003 | Meadowcroft | 385/88 |
| 2003/0152355 A1 | 8/2003 | Verdiell et al. | |
| 2004/0114873 A1 * | 6/2004 | Alexeev et al. | 385/52 |
| 2004/0118818 A1 * | 6/2004 | Oda et al. | 219/121.64 |
| 2004/0234204 A1 * | 11/2004 | Brun et al. | 385/39 |

FOREIGN PATENT DOCUMENTS

| | | |
|---|---|---|
| JP | 02064609 A * | 3/1990 |
| JP | 07-168056 | 7/1995 |
| JP | 2002-139643 | 5/2002 |
| JP | 2002-267973 A | 9/2002 |
| JP | 2002-357786 A | 12/2002 |

* cited by examiner

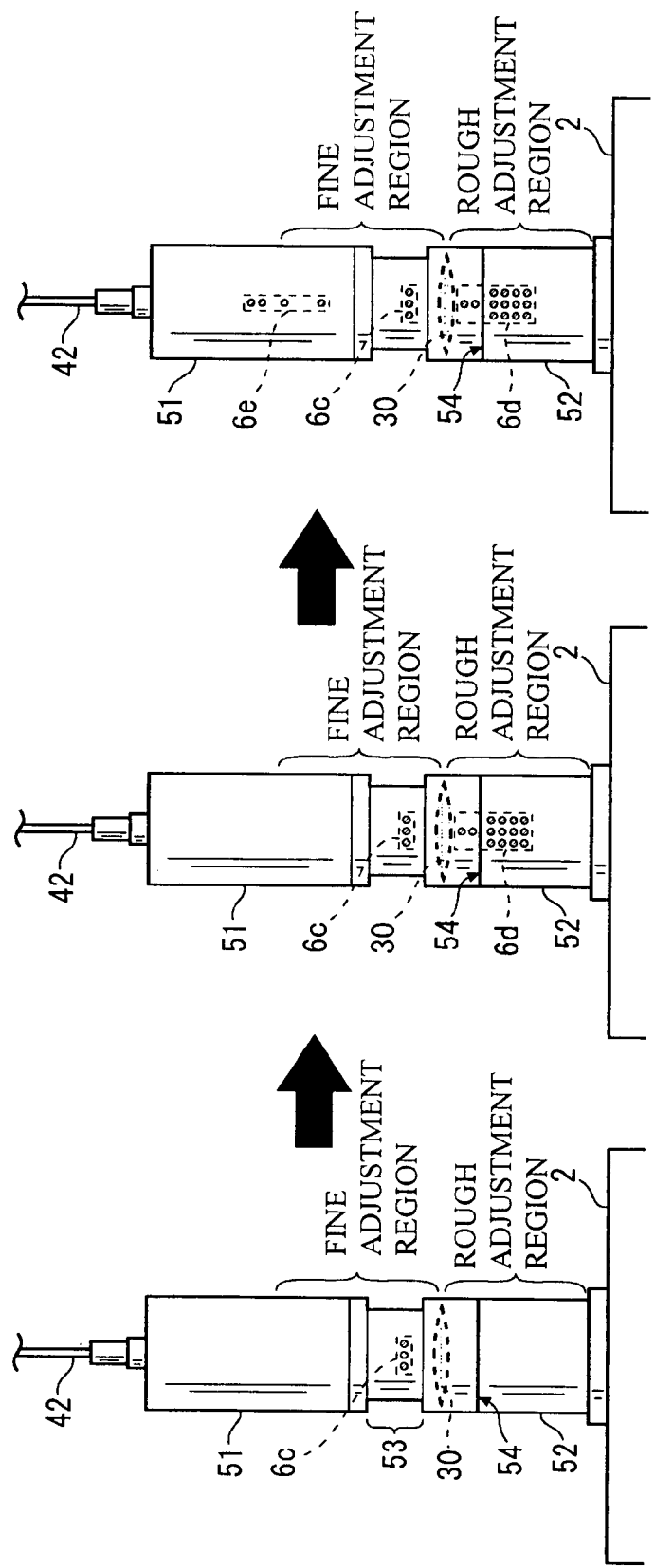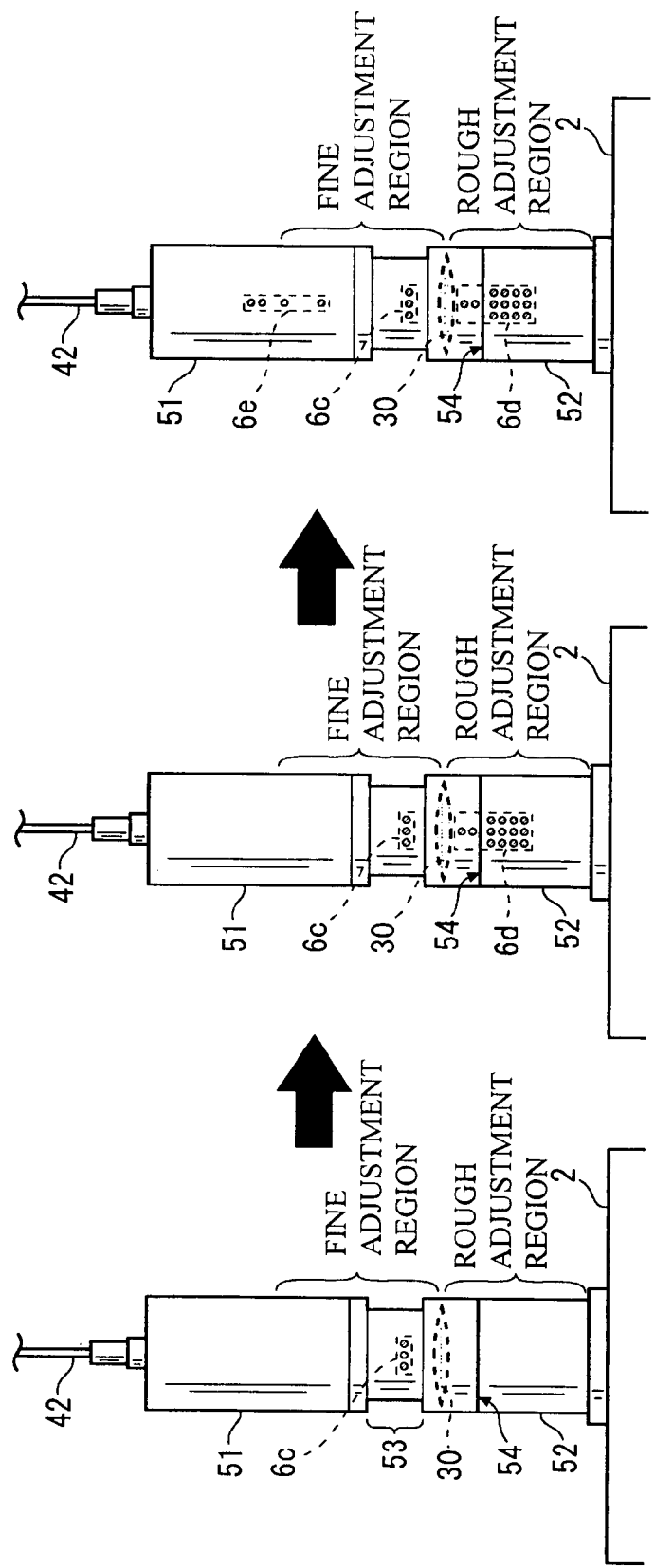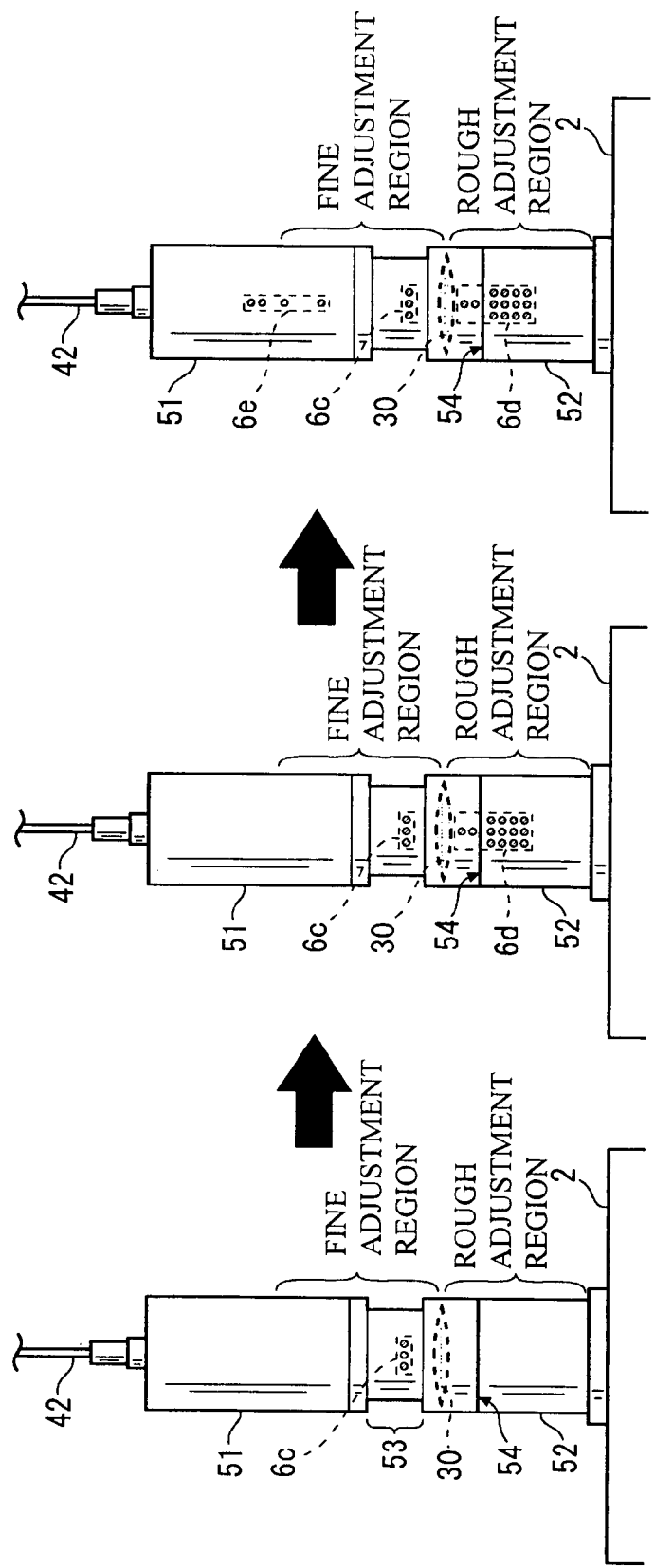

AMOUNT OF ADJUSTMENT IN
ROUGH ADJUSTMENT REGION

OPTICAL AXIS ADJUSTING METHOD, OPTICAL MODULE PRODUCING METHOD, OPTICAL AXIS ADJUSTING APPARATUS, AND OPTICAL MODULE

CROSS-REFERENCE TO RELATED APPLICATIONS

This application is a divisional of application Ser. No. 10/895,988, filed on Jul. 22, 2004, which claims the priority of Japanese Application No. 2003-200649, filed on Jul. 23, 2003, both of which are incorporated herein by reference.

BACKGROUND OF THE INVENTION

1. Field of the Invention

The present invention relates to an optical axis adjusting method, an optical module producing method, an optical axis adjusting apparatus, and an optical module.

2. Description of the Related Art

In a conventional optical output device in which a light-emitting element and optical fiber are optically coupled to each other through a lens, deviation of an optical axis is corrected to eliminate irregularity in the optical coupling. The supporting component of the optical fiber is irradiated with a laser beam, and the correction is performed based on deformation of the spots irradiated with the laser beam. Such a structure is disclosed in Japanese Laid-Open Patent Application Publication No. 63-163416, for example. FIG. 1 illustrates the disclosed structure.

As shown in FIG. 1, an optical output device 100 includes a supporting member 110 that supports a light-emitting element 140, a supporting member 120 that supports a condenser lens 150, and a supporting member 130 that supports the incident face of optical fiber 160. In this structure, the supporting member 130 is spot-fused with a laser beam 101. By doing so, the supporting member 130 is deformed so that light 141 condensed by the condenser lens 150 is incident upon the incident face of the optical fiber 160.

So as to obtain a necessary amount of distortion to adjust optical axes in the above conventional structure, however, it is necessary to adjust the intensity of the laser beam 101 or to increase the number of times to emit the laser beam 101. As a result, adjusting the intensity of the laser beam 101 involves sensitive work, and the laser beam 101 is emitted an increased number of times. These problems cause further problems such as a complicated production method and an increase in the costs.

SUMMARY OF THE INVENTION

It is therefore an object of the present invention to provide an optical axis adjusting method and apparatus in which the above disadvantages are eliminated.

A more specific object of the present invention is to provide an optical axis adjusting method and apparatus that can perform optical axis adjustment with high efficiency and high precision. Another specific object of the present invention is to provide a method of easily and efficiently producing an optical module having an optical axis adjusted with high precision. Further specific object of the present invention is to provide an optical module having an optical axis adjusted with high precision.

The above objects of the present invention are achieved by an optical axis adjusting method for adjusting a tilt angle of an optical axis in two regions that are optically coupled in a holding member, comprising the steps of: roughly adjusting the optical axis by irradiating a first region on the holding member with a laser beam; and finely adjusting the optical axis by irradiating a second region on the holding member with a laser beam, one of the two regions being a reference point, the first region being located closer to the reference point, and the second region being located further from the reference point.

The above-objects of the present invention are achieved by an optical axis adjusting method for adjusting a tilt angle of an optical axis in two regions that are optically coupled through a lens optical system held by a holding member, comprising the steps of: irradiating a first region on the holding member with a laser beam, the first region being located on the same side of the lens optical system as a reference point that is one of the two regions; and irradiating a second region on the holding member with a laser beam, the second region being located on the opposite side of the lens optical system from the reference point, one of the first region and the second region being a region in which the tilt angle of the optical axis is roughly adjusted, and the other one of the first region and the second region being a region in which the tilt angle of the optical axis is finely adjusted.

BRIEF DESCRIPTION OF THE DRAWINGS

Other objects, features and advantages of the present invention will become more apparent from the following detailed description when read in conjunction with the accompanying drawings, in which:

FIGS. 13A through 13C illustrate the operation of an optical axis adjusting apparatus in accordance with a second embodiment of the present invention;

DESCRIPTION OF THE PREFERRED EMBODIMENTS

The following is a description of preferred embodiments of the present invention, with reference to the accompanying drawings.

First Embodiment

Figure 1:
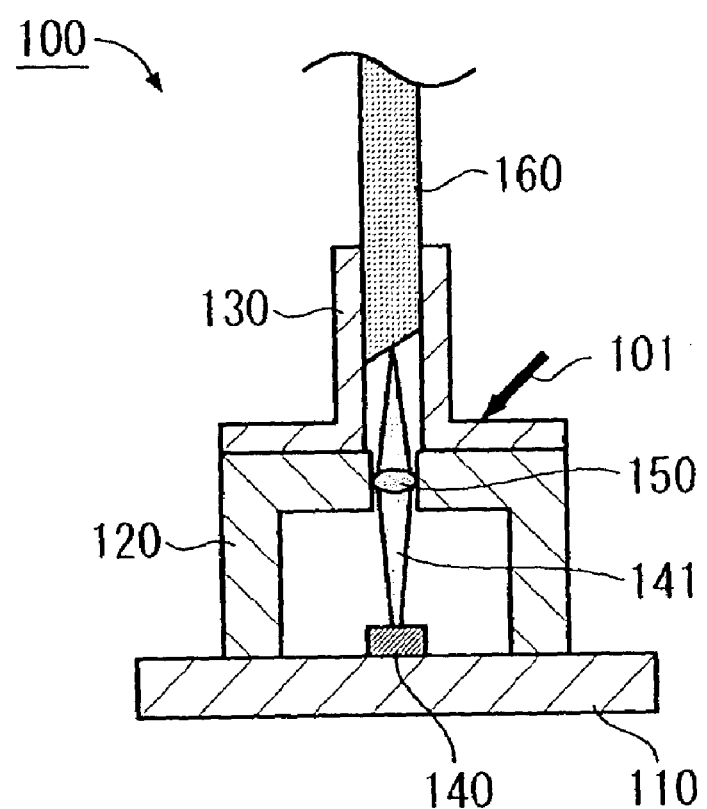
FIG. 1 illustrates the structure of a conventional optical output device in which a light-emitting element and optical fiber are optically coupled to each other through a lens.
Figure 2:
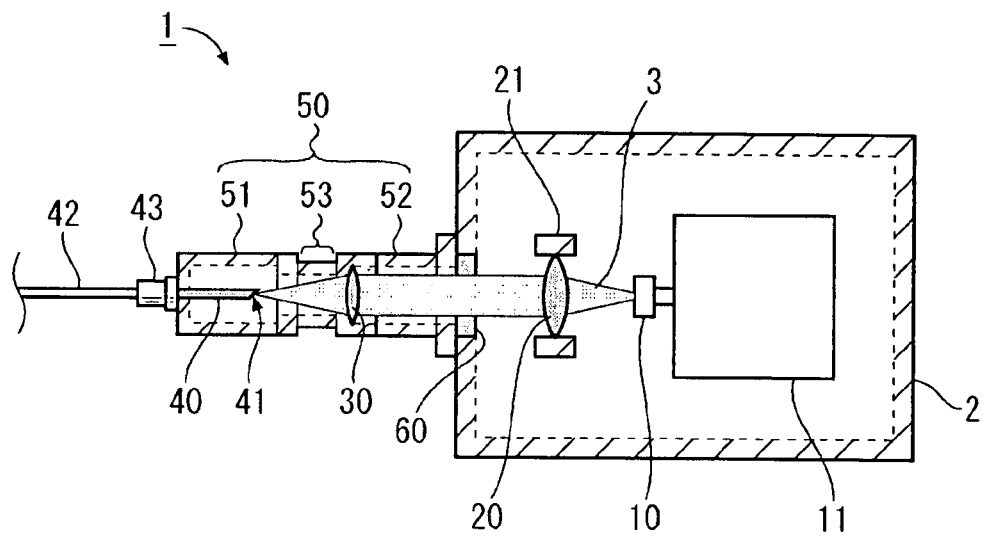
FIG. 2 is an inner perspective view of the entire structure of an optical output device in accordance with a first embodiment of the present invention.

Referring first to FIG. 2, a first embodiment of the present invention will be described in detail. FIG. 2 is an inner perspective view of the entire structure of an optical output device 1 in accordance with this embodiment. The optical output device 1 is an optical module that can be used as a light source in the field of optical communication and other fields of technology. As shown in FIG. 2, the optical output device 1 includes a main housing 2 and a sub-housing 50. Optical fiber 42 is connected to the top end of the sub-housing 50 through a connector unit 43.

The main housing 2 accommodates a light-emitting element 10, a drive circuit 11, and a collimate lens 20. The light-emitting element 10 is made of a semiconductor material such as silicon (Si), gallium arsenic (GaAs), or indium phosphorus (InP). The drive circuit 11 drives the light-emitting element 10. The collimate lens 20 converts a laser beam 3 outputted from the light-emitting element 10 into a parallel beam. The light-emitting element 10 and the drive circuit 11 are securely mounted to the main housing 2. The collimate lens 20 is secured by a supporting member 21. The laser beam 3 outputted from the light-emitting element 10 and then converted into a parallel beam by the collimate lens 20 is incident on the exterior of the main housing 2 (the interior of the sub-housing 50) through a window 60 formed in a wall of the main housing 2. The window 60 is made of quartz or glass.

The sub-housing 50 is provided outside the window 60, and the laser beam 3 emitted from the main housing 2 enters the hollow inside the sub-housing 50. The sub-housing 50 is welded to the main housing 2 by a predetermined laser beam emitting unit, or is bonded to the main housing 2 with a solder or some other adhesive. The sub-housing 50 accommodates a condenser lens 30 that condenses the laser beam 3, and a ferrule 40 that is a transmission medium protruding from the optical fiber 42. The sub-housing 50 is an assembly that includes a first housing 51 that holds the condenser lens 30 and the ferrule 40, and a second housing 52 that holds the first housing 51 with respect to the main housing 2. The first housing 51 holds the condenser lens 30 and the ferrule 40 in such a manner that the laser beam 3 condensed by the condenser lens 30 is incident onto the incident face 41 of the ferrule 40. The first housing 51 has a narrow part 53 that is formed to hold the condenser lens 30. The outer diameter of the cross section (perpendicular to the light propagating direction) of the narrow part 53 is smaller than the outer diameter of the cross section (parallel to the cross section of the narrow part 53) of any other part of the sub-housing 50. The thickness of the outer wall of the narrow part 53 may be equal to the thickness of the outer wall of any other part of the sub-housing 50, but it is more preferable to form the narrow part 53 to have a thinner outer wall than the outer wall of any other part of the sub-housing 50. The first housing 51 and the second housing 52 are welded to the main housing 2 by a predetermined laser irradiation unit, or are bonded to the main housing 2 with a solder or some other adhesive. Each of the first housing 51 and the second housing 52 may be a single member, or may be an assembly that includes welded or bonded members.

The collimate lens 20, the condenser lens 30, and the incident face 41 of the ferrule 40 function as optical coupling components. In this embodiment, spot irradiation with laser beams (laser beams 6A and 6B shown in FIGS. 10A and 11A) is performed on the surface of the trunk of the sub-housing 50 with a predetermined laser irradiation unit, so as to adjust the relationship (a tilt angle, for example) between optical axes in regions optically coupled through the respective optical coupling components. The spots on the sub-housing 50 irradiated with the laser beams (6A and 6B) are melted and are then solidified by cooling. Through this process, the sub-housing 50 is deformed, and the optical axes of the optical coupling components shift. Using the shifting, the positions and inclinations of the optical axes in regions optically coupled through the optical coupling components are adjusted to correct deviations of the optical axes in different regions to achieve a desired positional relationship and desired inclinations. The laser irradiation unit may or may not be the same one as the laser irradiation unit used for bonding the housing components. Also, the laser irradiation unit may be a laser welding device such as a YAG laser device.

In the following, examples of deviations of optical axes caused in different regions coupled in the optical output device 1, especially inside the sub-housing 50, will be described in detail.

Figure 3A:
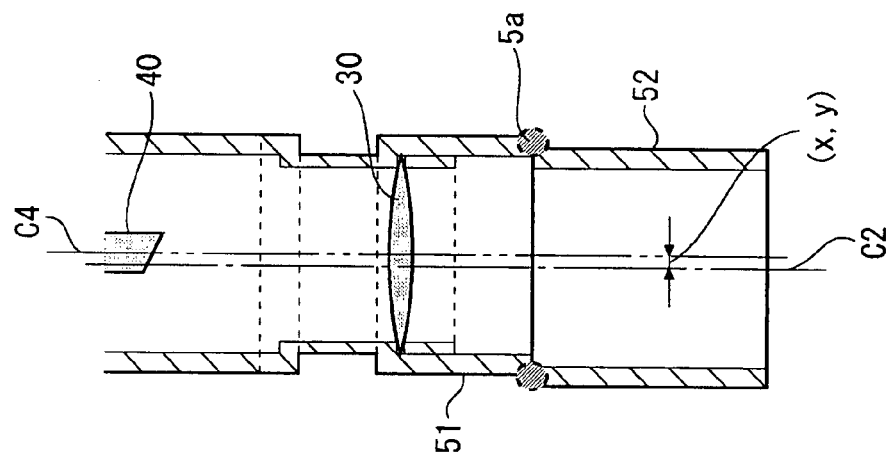
FIGS. 3A through 3C illustrate deviations of optical axes caused when the first housing is welded to the second housing in the structure of the first embodiment.
Figure 3B:
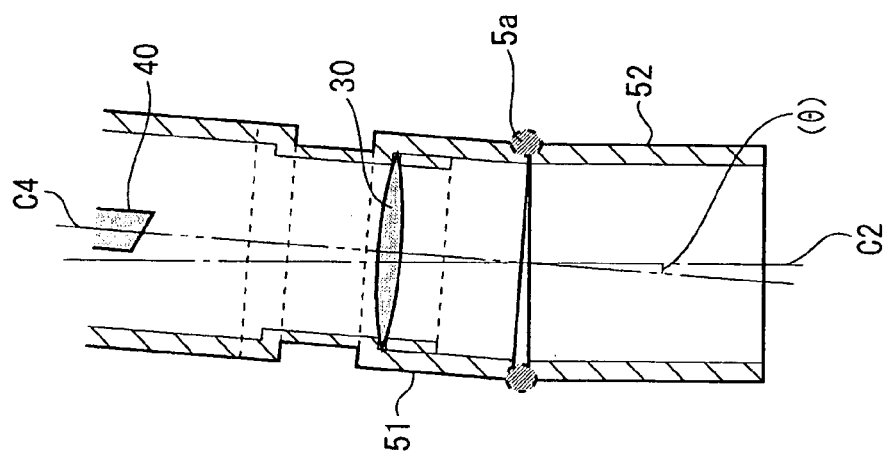
Figure 3C:
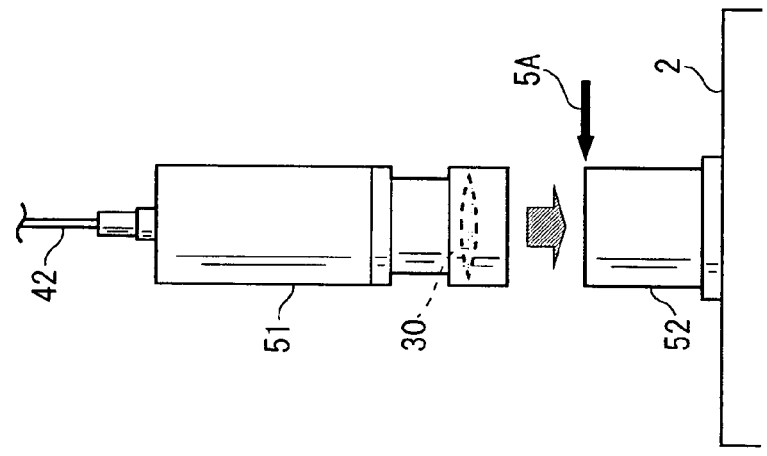

FIGS. 3A through 3C show deviations of optical axes caused when the first housing 51 is welded to the second housing 52. FIG. 3A illustrates the process of welding the first housing 51 to the second housing 52, using the laser irradiation unit (a laser welding device). As shown in FIG. 3A, the second housing 52 is attached to the main housing 2 in advance. While being positioned to the second housing 52 secured to the main housing 2, the first housing 51 is brought into contact with the second housing 52, and is then welded to the second housing 52 by spot irradiation with a laser beam 5A. Here, welded points 5a are formed in the spots where the spot irradiation with the laser beam 5A has been performed.

If the first housing 51 is welded to the second housing 52 in a situation where the optical axis C4 of the ferrule 40 held by the first housing 51 tilts with respect to the optical axis of the light outputted from the main housing 2 (the light being the laser beam 3 outputted from the collimate lens 20 in this embodiment), which is the optical axis C2 of the collimate lens 20, a gap (θ) is caused between the optical axes C2 and C4 due to the tilting, as shown in FIG. 3B. Such a gap is also caused by the difference in the amount of deformation among the welded points 5a. If the first housing 51 is welded to the second housing 52 in a situation where the optical axis C4 of the ferrule 40 held by the first housing 51 tilts with respect to the optical axis C2 of the collimate lens 20 in the X direction and the Y direction on a plane perpendicular to the optical axis C2, a parallel gap (x, y) is caused between the optical axes C2 and C4, as shown in FIG. 3C. Such a parallel gap (x, y) may also be caused from differences in the amount of deformation among the welded points 5a.

Figure 4A:
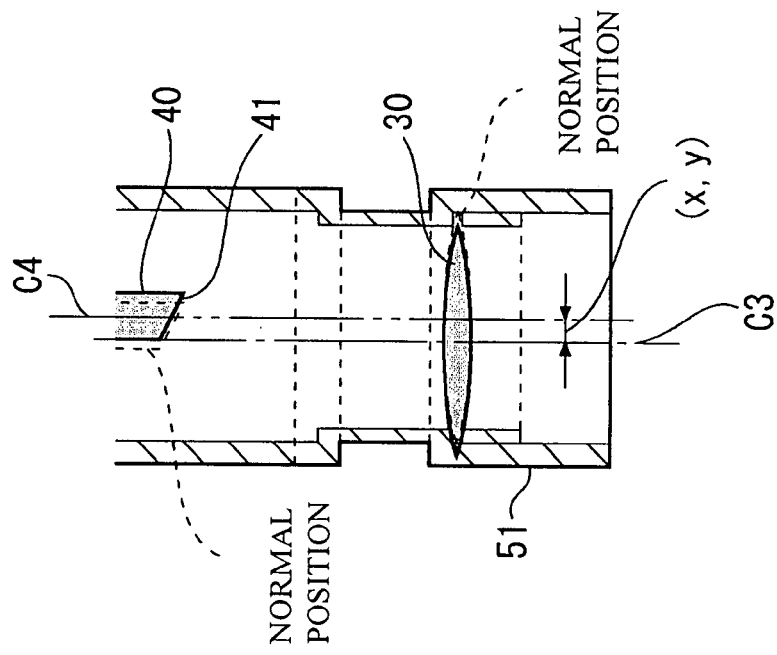
FIGS. 4A and 4B illustrate deviations of optical axes caused between the condenser lens and the ferrule in the structure of the first embodiment.
Figure 4E:
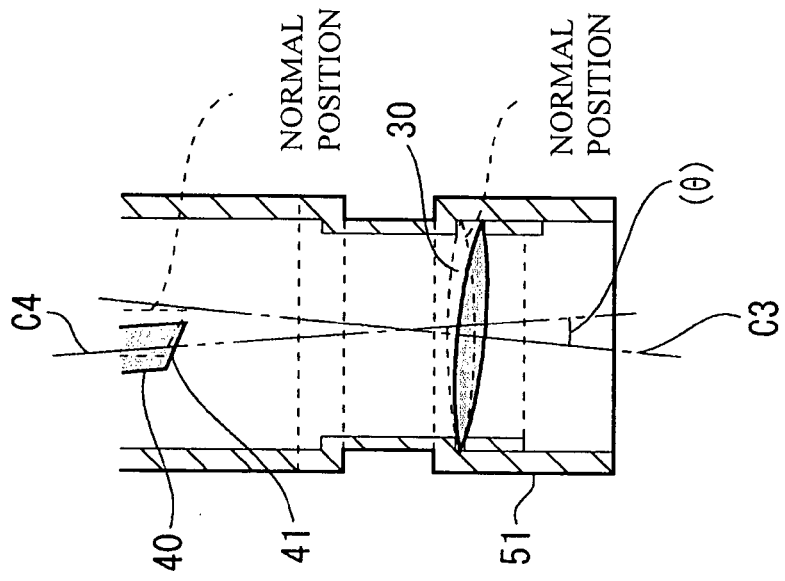

FIGS. 4A and 4B illustrate deviations of optical axes between the condenser lens 30 and the ferrule 40. As shown in FIGS. 4A and 4B, if the condenser lens 30 and the ferrule 40 are not properly positioned to predetermined positions in the first housing 51, for example, in a case where the optical axis C3 of the condenser lens 30 tilts with respect to the optical axis C4 (see FIG. 4A) or where the optical axis C3 of the condenser lens 30 and the optical axis C4 of the ferrule 40 deviate in the X direction and the Y direction (see FIG. 4B), a gap (x, y, θ) is caused between the optical axis C3 and the optical axis C4, as shown in FIGS. 4A and 4B.

Figure 5:
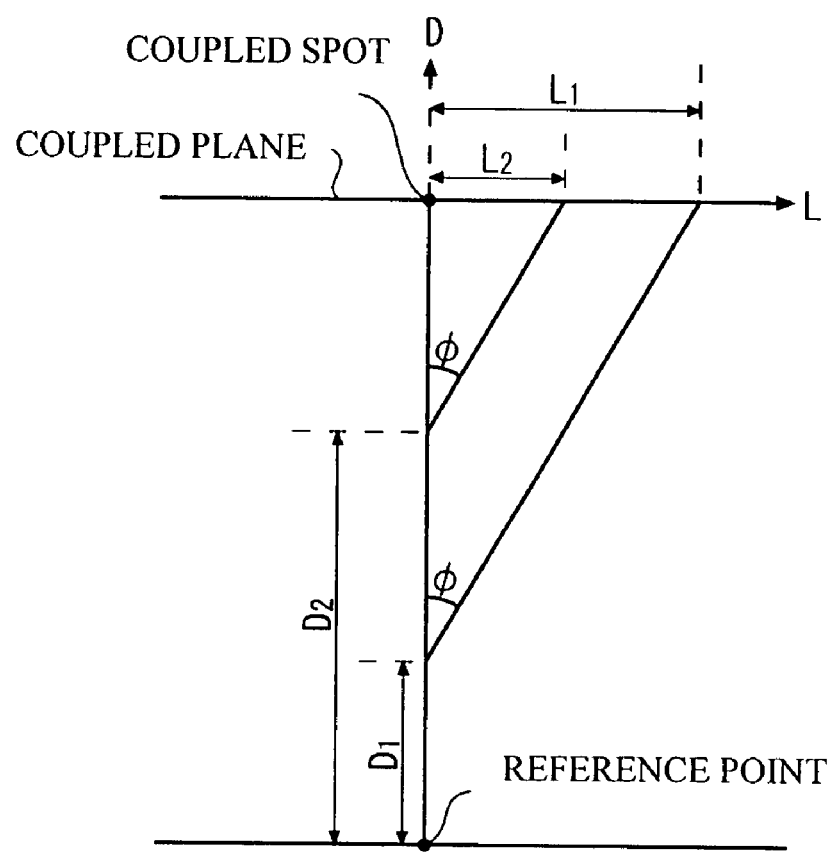
FIG. 5 is a graph showing the relationship between the distance from the reference point along the optical axis, and the distance by which a coupled component is moved in a direction perpendicular to the optical axis through one-time laser irradiation.

The gap (x, y, θ) causes a decrease in the light quantity of the laser beam 3 entering the ferrule 40. To counter this problem in this embodiment, the surface of the trunk of the sub-housing 50 is irradiated with a laser beam, so that the optical axes are adjusted by virtue of the deformation of the sub-housing 50 caused by the laser irradiation. By doing so, the relationship between the incident face 41 of the ferrule 40 and the focal point of the laser beam 3, which involves the positions and tilts of the optical axis C4 of the ferrule 40 and the optical axis C3 of the condenser lens 30, and the relationship between the optical axis C2 of the collimate lens 20 and the positions and tilts of the optical axes C3 and C4, are controlled to increase the light quantity of the laser beam 3 entering the ferrule 40. Here, the amount of adjustment to be made to the optical axes with a laser beam of a constant intensity varies with the distance from a reference point set in an optically coupled region that is located on the opposite side of the condenser lens 30 from the region between the incident face 41 and the condenser lens 30. Assuming that the angle φ of an optical axis to be adjusted by a laser beam of a constant intensity is constant, regardless of the shape of the sub-housing 50, the distance L by which the optical axis is moved through one-time laser irradiation becomes longer ($L_1 > L_2$) as the distance D becomes shorter ($D_2 > D_1$), as shown in FIG. 5. Here, the distance L is perpendicular to an optical axis extending from the reference point to the coupled plane, and the distance D is a distance along the optical axis from the reference point. Therefore, a greater amount of adjustment can be obtained by performing laser irradiation at a location closer to the reference point along the optical axis.

Figure 6A:
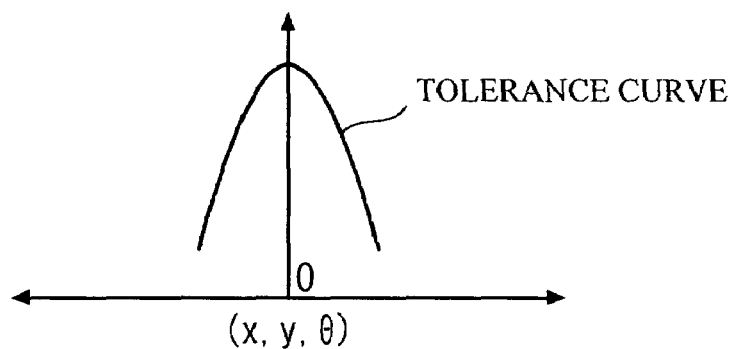
FIG. 6A is a graph showing the optical coupling tolerance of the condenser lens in the structure of the first embodiment.
Figure 6B:
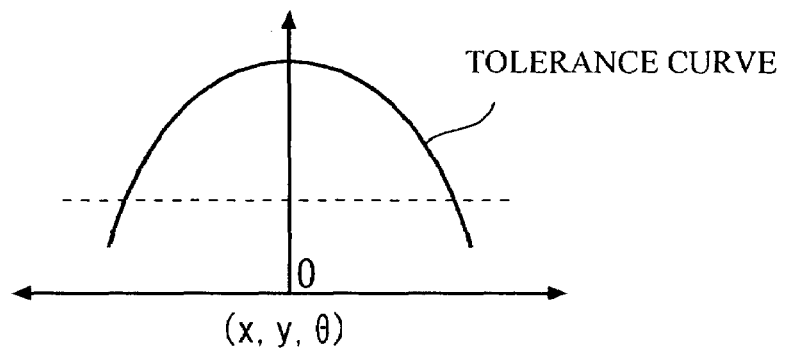
FIG. 6B is a graph showing the optical coupling tolerance of the incident face of the ferrule in the structure of the first embodiment.

In a case where two or more of optical coupling components (such as the condenser lens 30 and the incident face 41 in this embodiment) are employed, the tolerance for the gap (x, y, θ), which is the optical coupling tolerance, varies among the optical coupling components. FIGS. 6A and 6B show the optical coupling tolerances of the condenser lens 30 and the incident face 41 of the ferrule 40 of this embodiment. FIG. 6A is a graph showing the optical coupling tolerance of the condenser lens 30. FIG. 6B is a graph showing the optical coupling tolerance of the incident face 41 of the ferrule 40. As can be seen from FIG. 6A, the tolerance curve of the condenser lens 30 is relatively tight. This means that the tolerance for the gaps (x, y, θ) is low. On the other hand, the tolerance curve of the incident face 41 of the ferrule 40 is relatively wide, as shown in FIG. 6B. Accordingly, the optical coupling tolerance of the incident face 41 of the ferrule 40 is greater than that of the condenser lens 30.

Figure 7:
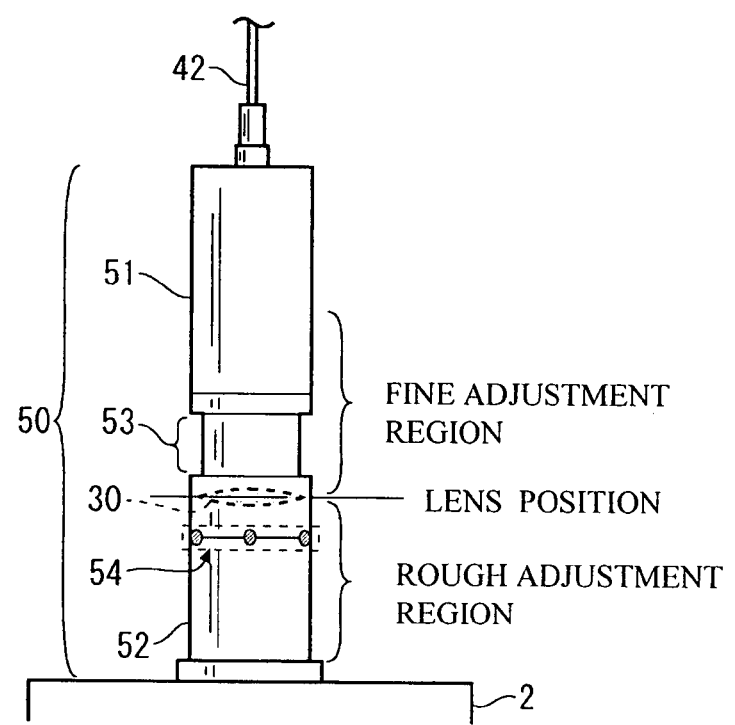
FIG. 7 is an external view illustrating a rough adjustment region and a fine adjustment region on the surface of the trunk part of the sub-housing in the structure of the first embodiment.

For the above reason, the reference point is set on the side of the main housing 2, and the region on the surface of the trunk of the sub-housing 50 that is closer to the reference point and is located between the condenser lens 30 and the main housing 2, which is the region in which the optical axis C3 of the condenser lens 30 and the optical axis C4 of the ferrule 40 can be adjusted and a relatively large amount of adjustment is made with a laser beam of a constant intensity, is set as a region for roughly performing optical axis adjustment (hereinafter referred to as the "rough adjustment region") in this embodiment, as shown in FIG. 7. Also, the region on the sub-housing 50 that is further away from the reference point, which is the region in which the optical axis C4 of the ferrule can be adjusted and a relatively small amount of adjustment is made with a laser beam of a constant intensity, is set as a region for finely performing optical axis adjustment (hereinafter referred to as the "fine adjustment region").

In this manner, multi-stage adjustment is made in the following regions: the rough adjustment region in which a relatively large amount of adjustment is made with a laser beam of a constant intensity, and the fine adjustment region in which a relatively small amount of adjustment is made with a laser beam of a constant intensity. Thus, with this embodiment, optical axis adjustment can be readily performed with high efficiency and high precision.

However, the welded portions of the components of the sub-housing 50, especially the welded portion 54 between the first housing 51 and the second housing 52, should not be included in the rough adjustment region and the fine adjustment region. This is because laser irradiation on the welded portions adds to the distortion of the welded portions, and, as a result, the bonding strength between components may decrease, or the optical axes might return to the original tilting positions after optical axis adjustment. In a case where the surface of the trunk of the sub-housing 50 (excluding the welded portions) is deformed through laser irradiation, on the other hand, complicated stress strain is not caused inside, and therefore, the sub-housing 50 becomes resistant to temperature stress and changes with time. Thus, the occurrence of cracks and welding splits can be prevented. Accordingly, shifting of the optical axes due to a temperature stress and changes with time can be prevented, and an optical module with higher long-term reliability and stability can be realized.

Also, in a case where the welded portions are to be irradiated with a laser beam (or where the welded portions are included in the rough adjustment region or the fine adjustment region), a laser beam (6A or 6B) that exhibits great enough power to melt the welded points 5a needs to be emitted. As a result, power control of the laser beam (6A or 6B) becomes difficult, and the possibility of laser irradiation with too much energy increases. If laser irradiation with too much energy is provided, an optical axis deviation is caused on the opposite side from the deviation before the adjustment (or the optical axis tilts to the opposite side). To solve this problem, the laser emitting direction (the laser emitting position) needs to be moved to the opposite side. In that case, a procedure of correcting the position of the optical output device 1 or the laser irradiation unit needs to be added to the process, and the number of laser emitting times also increases. As a result, the process becomes complicated, and the production efficiency deteriorates. Further, in a case where optical axis adjustment is performed on the welded portions, the amount of adjustment through laser irradiation cannot be controlled, due to inherent factors such as internal stress existing in the welded portions. In this embodiment, on the other hand, the surface of the trunk of the sub-housing 50, excluding the welded portions, is to be irradiated with a laser beam, so that the above described problems can be solved.

Figure 8A:
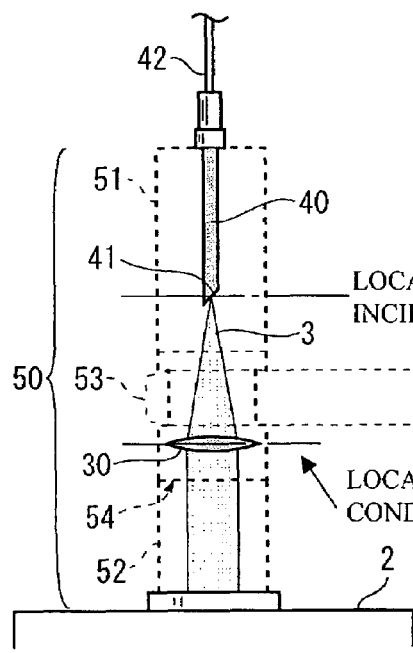
FIG. 8A is an inner perspective view of the sub-housing in the structure of the first embodiment.
Figure 8B:
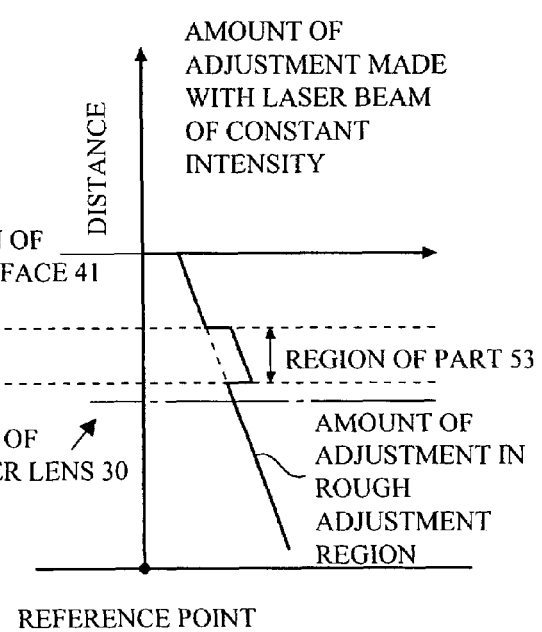
FIG. 8B is a graph showing the relationship between the amount of adjustment made with a laser beam of a constant intensity in the rough adjustment region and the amount of adjustment made with the laser beam in the fine adjustment region with respect to the distance from the reference point along the optical axis.

Referring now to FIGS. 8A and 8B, the relationship between the amount of adjustment in the rough adjustment region and the amount of adjustment in the fine adjustment region will be described. FIG. 8A is an inner perspective view of the sub-housing 50. FIG. 8B is a graph showing the amount of adjustment that can be made with a laser beam of a constant intensity with respect to the distance along the optical region from the reference point that is an optically coupled region on the opposite side of the condenser lens 30 from the region between the incident face 41 and the condenser lens 30. As shown in FIGS. 8A and 8B, the amount of adjustment in the region between the main housing 2 and the condenser lens 30, which is the rough adjustment region, is greater than the amount of adjustment in the fine adjustment region, because the movement of the optical axis becomes greater as the deformation of the sub-housing 50 becomes greater due to the function of the condenser lens 30. Also, in the rough adjustment region, the amount of adjustment increases as the distance from the reference point becomes shorter, which is true to the principles described above with reference to FIG. 5. In the region between the condenser lens 30 and the incident face 41, which is the fine adjustment region, on the other hand, the amount of adjustment is smaller than in the rough adjustment region, because the function of the condenser lens 30 does not affect the fine adjustment region. Also, in the fine adjustment region, the amount of adjustment reduces as the distance from the reference point becomes longer. Taking advantage of the optical characteristics and configuration characteristics described above, this embodiment can readily provide a desired amount of adjustment with high precision and high efficiency, through laser beam irradiation and control over the distance from the reference point.

In a case where a lens optical system that forms a magnification optical system is employed in place of the condenser lens 30, however, the amount of movement of the optical axis caused by the deformation of the sub-housing 50 in the region on the reference point side of the lens optical system (equivalent to the rough adjustment region) decreases due to the function of the magnification optical system. The amount of movement of the optical axis caused by the deformation of the sub-housing 50 in the region on the opposite side of the lens optical system from the reference point is not affected by the function of the magnification optical system. In view of this, the relationship shown in FIG. 8B might be reversed, n a case of a magnification optical system. Therefore, based on the positions of laser irradiation and the characteristics of a lens optical system, various modifications may be made to the arrangement of the rough adjustment region and the fine adjustment region, with the lens optical system being provided in between. In this embodiment, such a lens optical system that optically couples two regions may be formed with a single lens or a combination of two or more lenses. The lens optical system may also be formed with an electrooptical material that can function as a lens. In this embodiment, however, the lens optical system is a single optical coupling component, or a combination of two or more optical coupling components.

Also, in this embodiment, the thickness of the wall of the narrow part 53 of the first housing 51 is smaller than any other part of the sub-housing 50, and the outer diameter of the cross section of the narrow part 53 is smaller than any other part of the sub-housing 50. Therefore, the amount of adjustment obtained by irradiating the narrow part 53 with a laser beam is greater than in the regions in the neighborhood of the narrow part 53, due to the effect of the configuration (see FIG. 8B).

Next, an optical axis adjusting method in accordance with this embodiment will be described in detail. In the situation that will be described below, laser welding is performed on the first housing 51 and the second housing 52 that tilt with respect to each other. As mentioned earlier, the laser irradiation unit for laser-welding the first housing 51 and the second housing 52 to each other may or may not be the same as the laser irradiation unit for deforming the sub-housing 50. Further, the laser irradiation unit employed here may be a laser welding device such as a YAG laser device.

Figure 9:
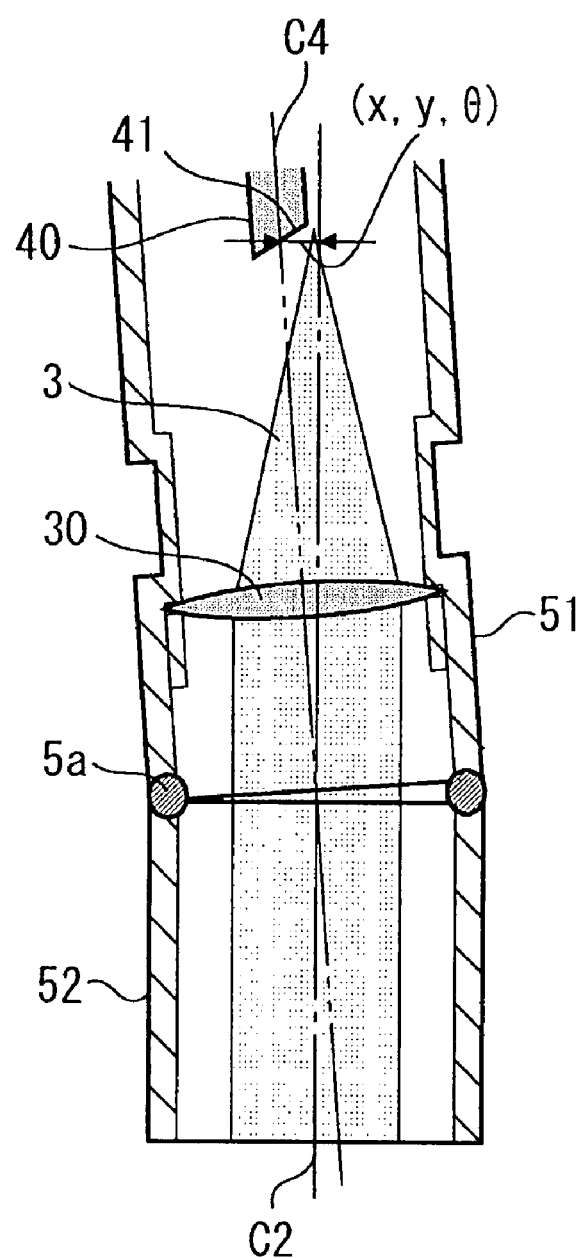
FIG. 9 is an inner perspective view of the structure in which laser welding has been performed on the first housing and the second housing that tilt with respect to each other.

FIG. 9 is an inner perspective view of a structure in which laser welding has been performed on the first housing 51 and the second housing 52 tilting with respect to each other. As shown in FIG. 9, because of the laser welding performed on the first housing 51 and the second housing 52 tilting with respect to each other, a tilt is caused between the optical axis C2 and the optical axis C4. As a result, a gap (x, y, θ) including the horizontal element (x, y) and the angle element θ is caused between the optical axis C2 and the incident face 41 (especially at the center of the incident face 41) of the ferrule 40.

Figure 10B:
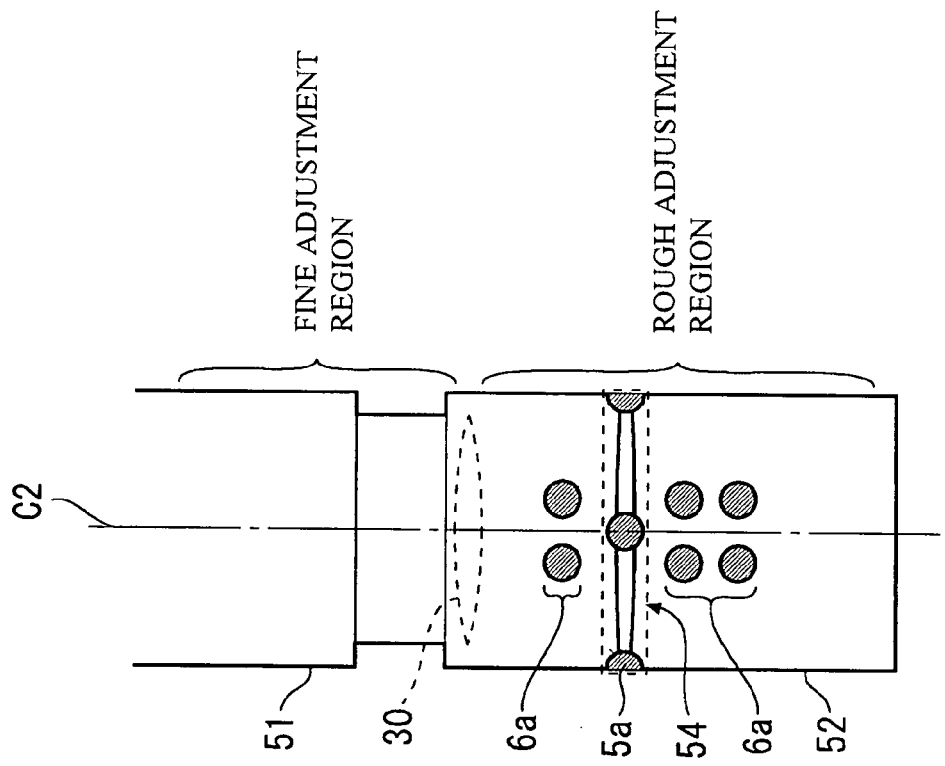
FIG. 10B is an external view of the sub-housing having the rough adjustment region irradiated with the laser beam.
Figure 10A:
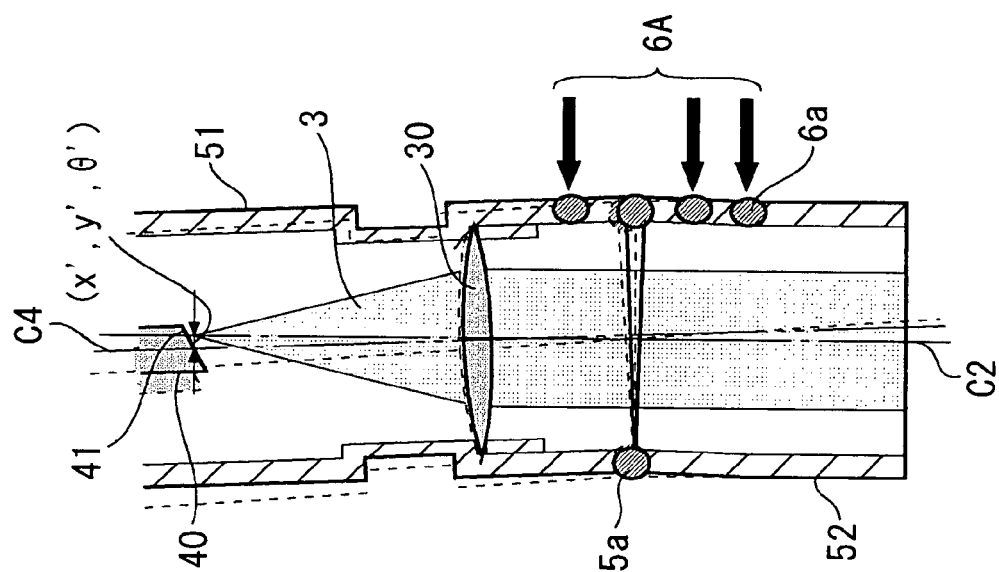
FIG. 10A is an inner perspective view illustrating a situation in which the rough adjustment region is irradiated with a laser beam emitted from a laser irradiation unit in a first step of an optical axis adjusting method in accordance with the first embodiment of the present invention.

In the first step of the optical axis adjusting method in accordance with this embodiment, the rough adjustment region that is closer to a reference point is irradiated with the laser beam 6A at least once, as shown in FIG. 10A. The reference point is the region that is located on the opposite side of the condenser lens 30 from the region between the incident face 41 and the condenser lens 30. Through the laser irradiation, welded points 6a are formed with a laser irradiation pattern shown in FIG. 10B. The laser irradiation with the laser beam 6A is performed on the opposite side from the side toward which the optical axis C4 tilts with respect to the optical axis C2. Here, the laser irradiation is preferably started from the location closest to the reference point along the optical axis C2. By doing so, the shape of the rough adjustment region of the sub-housing 50 is deformed, and the gap (x, y, θ) between the optical axis C2 and the center of the incident face 41 is roughly corrected. At the same time, the focal point of the condenser lens 30 approaches the optical axis C2, and the light quantity of the laser beam 3 to enter the ferrule 40 increases. The number of laser irradiation times and the laser irradiation pattern in this step are set so that the gap (x', y', θ') after the adjustment is equal to or smaller than the minimum value of the amount of adjustment to be made in the rough adjustment region. As described above, the laser beam 6A is not emitted onto the welded portion of each part of the sub-housing 50, especially onto the welded portion 54 between the first housing 51 and the second housing 52. Accordingly, a decrease in the joining strength of each part can be avoided, and the gap can be prevented from reappearing after the optical axis adjustment. Further, the laser beam 6A may or may not have the same intensity as the laser beam 6B.

Figures 11A, 11B:
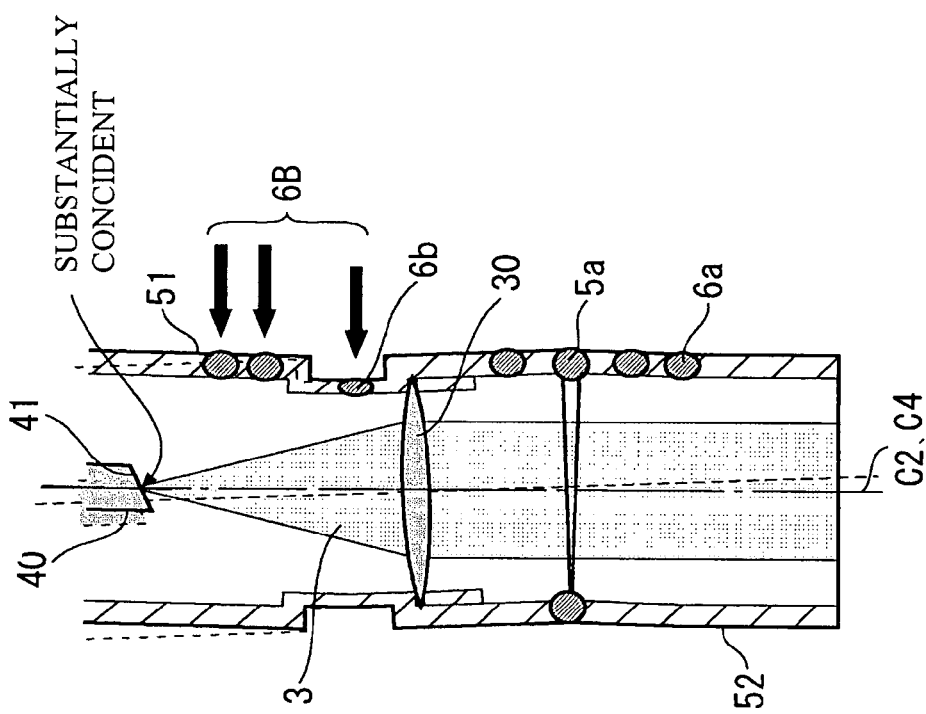
FIG. 11A is an inner perspective view illustrating a situation in which the fine adjustment region is irradiated with a laser beam emitted from a laser irradiation unit in a second step of the optical axis adjusting method in accordance with the first embodiment.
FIG. 11B is an external view of the sub-housing having the fine adjustment region irradiated with the laser beam.

After the largest possible rough adjustment of an optical axis is made in the rough adjustment region, the operation moves on to the second step in this embodiment. In the second step, the fine adjustment region is irradiated, at least once, with the laser beam 6B emitted from a laser irradiation unit, as shown in FIG. 11A, in which the laser module before adjustment is shown by the broken lines. Welded points 6b are then formed with a laser irradiation pattern shown in FIG. 11B. The laser irradiation with the laser beam 6B is performed on the opposite side from the side toward which the optical axis C4 tilts with respect to the optical axis C2, as shown in FIG. 11A. Here, the laser irradiation is preferably started from the location closest to the reference point along the optical axis C2, as in the case shown in FIG. 10A. By doing so, the shape of the fine adjustment region of the sub-housing 50 is deformed, and the gap (x', y', θ') between the optical axis C2 and the center of the incident face 41 is corrected or eliminated. Accordingly, the positional relationship between the center of the incident face 41 and the focal point of the condenser lens 30, which has been moved closer to the optical axis C2 in the first step, is further corrected so that the focal point of the condenser lens 30 is substantially located in the center of the incident face 41. Thus, a sufficient quantity of light can enter the ferrule 40. As in the first step, the welded portion of each part of the sub-housing 50 is not irradiated with the laser beam 6B in this step. Accordingly, a decrease in the joining strength of each part can be avoided, and the gap can be prevented from reappearing after the optical axis adjustment. Further, the laser beam 6B may or may not have the same intensity as the laser beam 6A and/or the laser beam 5A. In the above-mentioned manner, the optical axes C2 and C4 are thus aligned. f In a case where the locations of the rough adjustment region and the fine adjustment region are reversed, or, in a case where a demagnification optical system is employed as the lens optical system, the region (the rough adjustment region) between the lens optical system and the incident face 41 is irradiated with a laser beam in the first step, and the region (the fine adjustment region) located on the opposite side of the lens optical system from the rough adjustment region is irradiated with a laser beam in the second step.

Figure 12:
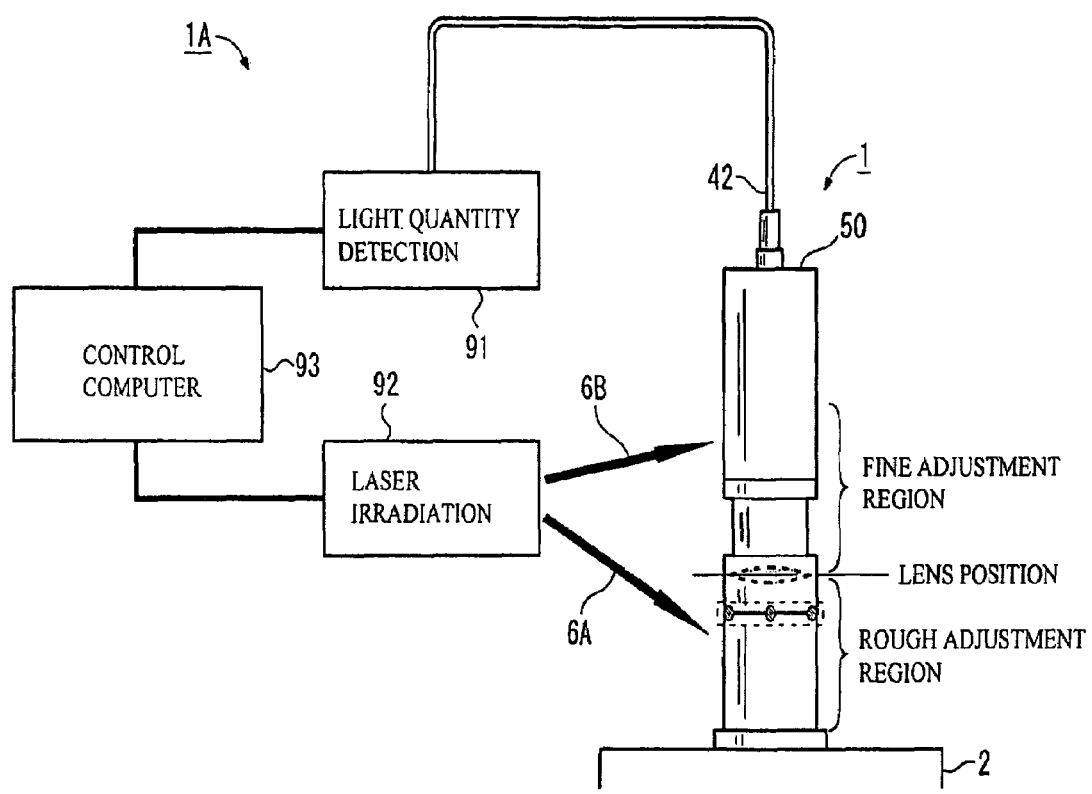
FIG. 12 is a block diagram illustrating the structure of an optical axis adjusting apparatus in accordance with the first embodiment of the present invention.

Each of the above steps is carried out, while light outputted through the optical fiber 42 is being monitored at one end of the optical fiber 42. FIG. 12 illustrates the structure of an apparatus (an optical axis adjusting apparatus 1A) that operates by the above optical axis adjusting method.

As shown in FIG. 12, the optical axis adjusting apparatus 1A includes the optical output device 1, a light quantity detection device 91, a control computer 93, and a laser irradiation device 92. The light quantity detection device 91 detects the light quantity of the laser beam 3 transmitted through the optical fiber 42. The control computer 93 controls the laser irradiation device 92, based on the light quantity of the laser beam 3 detected by the light quantity detection device 91. Under the control of the control computer 93, the laser irradiation device 92 irradiates the rough adjustment region with the laser beam 6A (the first step), and irradiates the fine adjustment region with the laser beam 6B (the second step). With the optical axis adjusting apparatus 1A having such a structure, optical axis adjustment can be performed, while deviations of the optical axes, the amount of adjustment, and the quantity of light entering the ferrule 40, are being monitored.

The optical axis adjusting method of this embodiment can be included as some steps in the method of producing the optical output device 1. Accordingly, an optical module that has optical axes adjusted with high precision and high efficiency can be readily produced, without an increase in the number of production procedures.

As described so far, in accordance with this embodiment, an optical output device that has optical axes adjusted stepwise with high precision can be efficiently and easily obtained by carrying out the first step of irradiating a first region with a laser beam and the second step of irradiating a second region with a laser beam. With one of two or more optical coupling components being a reference point (the incident face 41, for example), the region on the sub-housing 50 located closer to the reference point is set as the first region (the rough adjustment region, for example), and the region on the sub-housing 50 located further away from the reference point is set as the second region (the fine adjustment region, for example)

Also, an optical axis adjusting apparatus that can efficiently and readily make adjustments to the optical axes of an optical output device with high precision can be realized. Further, an optical axis adjusting method that can efficiently and readily carry out high-precision optical axis adjustment on an optical output device can be obtained. Still further, a method of readily and efficiently producing an optical output device that has optical axes adjusted with high precision can be realized.

This embodiment can be applied to an optical module that is interposed between optical fiber and a light-emitting element such as a laser chip or a light receiving chip, or between a laser chip and an optical modulator. This embodiment can also be applied to a passive optical module such as an assembly of a lens and an optical isolator.

Second Embodiment

Next, a second embodiment of the present invention will be described in detail. The structure and operation of this embodiment are the same as those of the first embodiment, unless specifically mentioned below.

In the first embodiment, largest possible adjustment is performed on optical axes in the first step. However, optical axis adjustment made in the rough adjustment region is relatively great in the adjustment step width, or has a larger minimum adjustment value than in the fine adjustment region. If largest possible adjustment is performed, the adjusted optical axis C4 might tilt toward the opposite side from the original titling position. In such a case, the emitting direction of the laser beam 6B needs to be adjusted to the opposite side from the emitting direction of the laser beam 6A. As a result, the process of moving on to the second step might become complicated.

As already mentioned in the description of the first embodiment, the incident face 41 has a greater optical coupling tolerance than the condenser lens 30. Accordingly, adjustment in the fine adjustment region exhibits more stable characteristics with temperature stress and changes with time than adjustment in the rough adjustment region.

In view of this, while the optical axis C4 is maintained in the same direction as the original tilting direction (or the tilting direction prior to the first step), largest possible optical axis adjustment in the situation is performed in the first step. For example, the total amount of adjustment made in the second step should be greater than the total amount of adjustment made in the first step.

With this structure, there is no need to adjust the laser emitting direction in the second step to the opposite direction from the laser emitting direction used in the first step, and the procedures can be prevented from becoming more complicated. Also, the above structure can exhibit stable characteristics with temperature stress and changes with time. The other aspects and operations of this embodiment are the same as those of the first embodiment, and explanation of them is omitted herein.

Third Embodiment

Next, a third embodiment of the present invention will be described in detail. This embodiment provides another example of an optical axis adjusting method. The structure and operation in accordance with this embodiment are the same as those in accordance with the first embodiment, unless specifically described below.

In the optical axis adjusting method in accordance with this embodiment, the same structure as the optical axis adjusting apparatus 1A of the first embodiment shown in FIG. 12 is employed. FIGS. 13A through 13C illustrate the operation of the optical axis adjusting apparatus 1A of this embodiment. The following description mainly concerns the operation of the control computer 93.

In a first step of the optical axis adjusting method of this embodiment, the control computer 93 measures the light quantity of a laser beam outputted from the optical output device 1 before optical axis adjustment is performed. The measurement is carried out with the light quantity detection device 91, and the detected light quantity of the laser beam will be hereinafter referred to as the detected light quantity P1. In a second step, several spots on the sub-housing 50 are irradiated with a laser beam 6C emitted from the laser irradiation device 92, so that welded points 6c are formed, as shown in FIG. 13A. The light quantity detection device 91 then measures the light quantity of a laser beam outputted from the optical output device 1. The light quantity measured in this step will be hereinafter referred to as the detected light quantity P2. At this point, the control computer 93 stores parameters, such as the irradiation amount (the number of irradiation times and the irradiation power) of the laser beam 6C at the time of driving the laser irradiation device 92 and the irradiation period of time (each irradiation period or the total irradiation period of the laser beam 6C). These parameters will be used to calculate the amount of optical axis adjustment (or the amount of recovery) in later steps. The laser irradiation spots in the second step may be located in any of the following three regions: the rough adjustment region, the fine adjustment region, and the narrow part 53. In FIG. 13A, the laser irradiation spots are located in the narrow part 53, for example.

After the detected light quantity P1 and the detected light quantity P2 are obtained, the operation of the control computer 93 moves on to a third step. In the third step, the control computer 93 calculates the amount of optical axis adjustment per unit energy, based on the difference between the detected light quantity P1 and the detected light quantity P2, and the total energy of the emitted laser beam 6C. In a fourth step, based on the difference between a target light quantity (detected by the light quantity detection device 91) and the detected light quantity P2, the control computer 93 calculates the amount of optical axis adjustment that is necessary to achieve the target light quantity.

In a fifth step, based on the calculated amount of optical axis adjustment, the control computer 93 determines the irradiation power, the number of irradiation times, and the irradiation spots of each of laser beams 6D and 6E to form welded points 6d and 6e, respectively.

After that, in a sixth step (see FIG. 13B), the control computer 93 controls the laser irradiation device 92 to perform rough adjustment using the irradiation power, the number of irradiation times, and the irradiation spots of the laser beam 6D that have been determined in the fifth step. In a seventh step (see FIG. 13C), the control computer 93 controls the laser irradiation device 92 to perform fine adjustment using the irradiation power, the number of irradiation times, and the irradiation spots of the laser beam 6E that have been determined in the fifth step. In this manner, optical axis adjustment can be performed to meet the necessary amount of optical axis adjustment to obtain a target light quantity. If there is no need to perform laser irradiation in the sixth or seventh step, or if the number of irradiation times is set at zero, it is possible to omit the step from the optical axis adjusting method.

As described so far, in this embodiment, the amount of optical axis adjustment necessary to obtain a target light quantity is calculated, and the control computer 93 automatically performs optical axis adjustment in accordance with the calculated amount of optical axis adjustment. The other aspects and operations of this embodiment are the same as those of the first embodiment, and therefore, explanation of them is omitted herein.

Fourth Embodiment

Next, a fourth embodiment of the present invention will be described in detail. This embodiment provides another example of a method of calculating the necessary amount of optical axis adjustment to achieve a target light quantity (equivalent to the first through fourth steps of the optical axis adjusting method in accordance with the third embodiment). The structure and operations of this embodiment are the same as those of the foregoing embodiments, unless specifically described below.

In the method of calculating the necessary amount of optical axis adjustment to achieve a target light quantity in accordance with this embodiment, the control computer 93 measures the light quantity of a laser beam outputted from the optical output device 1 before optical axis adjustment is performed. The measurement is carried out with the light quantity detection device 91, and the measured light quantity of the laser beam will be hereinafter referred to as the detected light quantity P11. In a second step, the laser irradiation device 92 emits the laser beam 6D onto the rough adjustment region on the sub-housing 50, and the light quantity detection device 91 then measures the light quantity of a laser beam outputted from the optical output device 1. The light quantity measured in this step will be hereinafter referred to as the detected light quantity P12. At this point, the control computer 93 stores parameters, such as the irradiation amount (including the number of irradiation times and the irradiation power) of the laser beam 6D at the time of driving the laser irradiation device 92 and the irradiation period of time (each irradiation period or the total irradiation period of the laser beam 6D). These parameters will be used to calculate the amount of optical axis adjustment (or the amount of recovery) in later steps. In a third step, the laser irradiation device 92 emits the laser beam 6E onto the fine adjustment region on the sub-housing 50, and the light quantity detection device 91 then measures the light quantity of a laser beam outputted from the optical output device 1. The light quantity measured in this step will be hereinafter referred to as the detected light quantity P13. At this point, the control computer 93 stores parameters, such as the irradiation amount (including the number of irradiation times and the irradiation power) of the laser beam 6E at the time of driving the laser irradiation device 92 and the irradiation period of time (each irradiation period or the total irradiation period of the laser beam 6E). These parameters will be used to calculate the amount of optical axis adjustment in later steps.

After the detected light quantity P11, the detected light quantity P12, and the detected light quantity P13 are obtained, the operation of the control computer 93 moves on to a fourth step. In the fourth step, the control computer 93 calculates the amount of optical axis adjustment per unit energy at the time of laser irradiation in the rough adjustment region, based on the difference between the detected light quantity P11 and the detected light quantity P12, and the total energy of the laser beam 6D. In a fifth step, the control computer 93 calculates the amount of optical axis adjustment per unit energy at the time of laser irradiation in the fine adjustment region, based on the difference between the detected light quantity P12 and the detected light quantity P13, and the total energy of the laser beam 6E.

In a sixth step, the control computer 93 calculates the amount of optical axis adjustment necessary to achieve a target light quantity (detected by the light quantity detection device 91), based on the difference between the target light quantity and the detected light quantity P13. The operation after the sixth step in this optical axis adjusting method is the same as the operation after the fifth step in the optical axis adjusting method of the third embodiment, and therefore, explanation of it is omitted herein. Also, the other aspects and operations of this embodiment are the same as those of the foregoing embodiments, and therefore, explanation them is omitted herein.

Fifth Embodiment

Next, a fifth embodiment of the present invention will be described in detail. In each of the foregoing embodiments, a lens optical system (the condenser lens 30 in the first embodiment) for optically coupling two regions is accommodated in the sub-housing 50 that is to be irradiated with a laser beam. In this embodiment, however, an optical coupling component such as a lens optical system that optically couples two regions is not provided in an object (a sub-housing 50B) to be irradiated with a laser beam. Instead, only the incident face 41 of the ferrule 40 is provided as an optical coupling component.

Figure 14A:
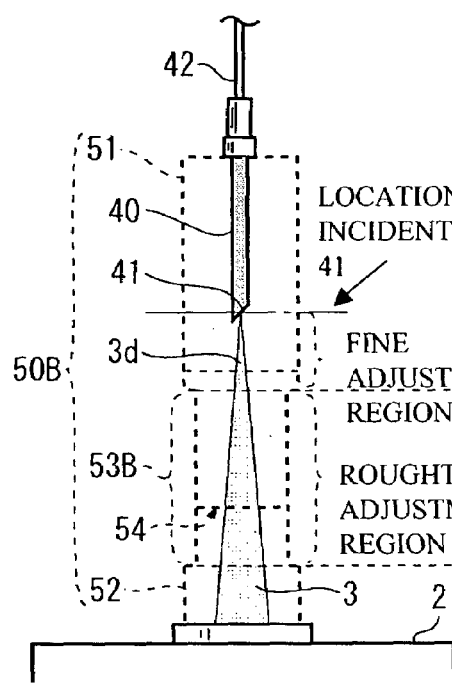
FIG. 14A is an inner perspective view illustrating the structure of a sub-housing in accordance with a fifth embodiment of the present invention.
Figure 14B:
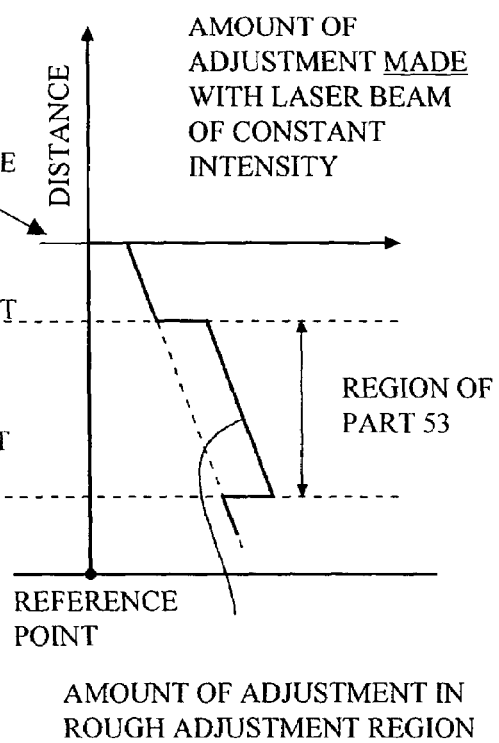
FIG. 14B is a graph showing the relationship between the distance from the incident face and the amount of adjustment to be made with a laser beam of a constant intensity in the sub-housing.

FIG. 14A is an inner perspective view of the sub-housing 50B of this embodiment. FIG. 14B is a graph showing the relationship between the distance from the reference point on the sub-housing 50B and the amount of adjustment made with a laser beam of a constant intensity. As shown in FIG. 14A, the sub-housing 50B has a narrow part 53B near the bottom (on the side of the main housing 2). The outer diameter of the cross section (a plane that is perpendicular to the light propagating direction) of the narrow part 53B is smaller than the outer diameter of the cross section (parallel to the cross section of the narrow part 53B) of any other part of the sub-housing 50B. Also, the thickness of the outer wall of the narrow part 53B is smaller than the thickness of the outer wall of any other part of the sub-housing 50B.

With the narrow part 53B, the amount of adjustment made with a laser beam of a constant intensity can be increased in the corresponding part (see FIGS. 8A and 8B). In this embodiment, the region on the surface of the trunk of the sub-housing 50B that corresponds to the narrow part 53B is set as the rough adjustment region, and the region that is closer to the incident face 41 and is located on the surface of the trunk, not including the narrow part 53B, is set as the fine adjustment region. With this arrangement, multi-stage adjustment can be performed, as in each of the foregoing embodiments, and optical axis adjustment can be readily performed with high efficiency and high precision. The other aspects of this embodiment are the same as those of the foregoing embodiments, and therefore, explanation of them is omitted herein.

Other Embodiments

In each of the foregoing embodiments, a cylindrical optical module (especially the sub-housing 50 and the sub-housing 50B) is employed. However, the present invention is not limited to cylindrical optical modules, but may be applied to optical modules having oval or polygonal cross sections. Further, the present invention may be applied to optical modules each having a flat substrate or a curved substrate as a holding member for optical coupling components.

In a case where a flat substrate is employed as the holding member, for example, optical coupling components such as a lens optical system are mounted onto a surface (the outer surface) of the substrate. In this structure, the outer surface of the back surface of the substrate is irradiated with a laser beam emitted from a device such as a laser welding device, so that the substrate as the holding member can be deformed, as in each of the foregoing embodiments. Thus, a tilt angle of an optical axis in two regions that are optically coupled can be adjusted. Although the substrate and the one or more optical coupling components mounted onto the substrate can be regarded as one optical module, a structure in which the substrate and the optical coupling components are all housed in a housing body can be considered as one optical module.

Finally, some aspects of the present invention are summarized below.

The optical axis adjusting method for adjusting a tilt angle of an optical axis in two regions that are optically coupled in a holding member, includes the steps of: roughly adjusting the optical axis by irradiating a first region on the holding member with a laser beam; and finely adjusting the optical axis by irradiating a second region on the holding member with a laser beam, one of the two regions being a reference point, the first region being located closer to the reference point, and the second region being located further from the reference point. The amounts of optical axis adjustment to be made through laser irradiation vary with the locations on the holding member along the optical axis. Using the difference in the amount of adjustment, rough adjustment is performed in one of the first region and the second region, while fine adjustment is performed in the other one of the first region and the second region. By doing so, step-by-step optical axis adjustment can be performed, and efficient and highly precise optical axis adjustment can be readily realized.

The optical axis adjusting method for adjusting a tilt angle of an optical axis in two regions that are optically coupled through a lens optical system held by a holding member, comprising the steps of: irradiating a first region on the holding member with a laser beam, the first region being located on the same side of the lens optical system as a reference point that is one of the two regions; and irradiating a second region on the holding member with a laser beam, the second region being located on the opposite side of the lens optical system from the reference point, one of the first region and the second region being a region in which the tilt angle of the optical axis is roughly adjusted, and the other one of the first region and the second region being a region in which the tilt angle of the optical axis is finely adjusted. The amounts of optical axis adjustment to be made through laser irradiation vary with the locations on the holding member along the optical axis. Especially between two regions partitioned by a lens optical system, the difference in the amount of adjustment to be made is very large. Using the difference in the amount of adjustment, rough adjustment is performed in one of the first region and the second region, while fine adjustment is performed in the other one of the first region and the second region. By doing so, step-by-step optical axis adjustment can be performed, and efficient and highly precise optical axis adjustment can be readily realized.

The optical axis adjusting method may be configured so that a magnification optical system is employed as the lens optical system, and/or the lens optical system has a focal length that is longer on the side of the reference point and shorter on the side of a coupled plane, so that the first region is set as a region in which the fine adjustment is performed, and that the second region is set as a region in which the rough adjustment is performed. In the case where the lens optical system is a magnification optical system, the degree of optical axis coupling per unit area on the coupled plane is smaller (if the reference point is the light source, the light quantity per unit area becomes smaller) than in a case where the lens optical system is not employed. Accordingly, if the light quantity obtained as a result of moving an optical axis through laser irradiation in the first region is smaller than the light quantity obtained as a result of moving an optical axis through laser irradiation in the second region, the first region serves as the fine adjustment region while the second region serves as the rough adjustment region. Also, in the case where the focal length of the lens optical system is longer on the side of the coupled plane than on the side of the reference point, the amount of optical axis movement on the coupled plane is smaller than in a case where the lens optical system is not employed. Accordingly, when the amount of optical axis movement is smaller than the amount of optical axis movement obtained through laser irradiation in the first region, the first region serves as the fine adjustment region while the second region serves as the rough adjustment region. As the lens optical system is set in the above manner, a higher degree of freedom can be allowed for optical axis adjustment in accordance with the present invention.

The optical axis adjusting method as claimed in claim 2, wherein the amount of adjustment of light quantity on a coupled plane to be controlled by irradiating the first region with a laser beam is determined by whether the lens optical system is a magnification optical system or a demagnification optical system and/or the ratio of the focal length of the lens optical system on the side of the reference point to the focal length of the lens optical system on the side of the coupled plane. In the case where the lens optical system is a demagnification optical system, the degree of optical axis coupling per unit area on the coupled plane is greater (if the reference point is the light source, the light quantity per unit area is greater) than in a case where the lens optical system is not employed. Accordingly, when the optical axis is moved through laser irradiation in the first region, the light quantity that varies on the coupled plane becomes greater. Also, in a case where the focal length of the lens optical system is short on the side of the reference point and long on the side of the coupled plane, the amount of movement of an optical axis through laser irradiation in the first region is greater than in a case where the lens optical system is not employed. In a case where the focal length of the lens optical system is long on the side of the reference point and short on the side of the coupled plane, the amount of movement of the optical axis is smaller than in a case where the lens optical system is not employed. As the focal length ratio is set by selecting the type of the lens optical system in the above manner, the amount of optical axis adjustment to be made can be arbitrarily set.

The optical axis adjusting method may be configured so that the step of roughly adjusting a tilt angle of the optical axis is carried out prior to the step of finely adjusting the tilt angle of the optical axis. The fine adjustment is performed after the rough adjustment, so that optical axis adjustment can be performed with higher efficiency and higher precision.

The optical axis adjusting method may be configured so that one or both of the above-mentioned steps are carried out by emitting a laser beam more than once along the surrounding area of the first region or the second region that surrounds the optical axis.

The optical axis adjusting method may be configured so that one or both of the steps are carried out by emitting a laser beam more than once onto different spots in the longitudinal direction of the optical axis in the first region or the second region. A laser beam is emitted more than once onto different spots along the optical axis in the first region or the second region, so that finer adjustment can be performed, and that higher precision can be achieved in the optical axis adjustment.

The optical axis adjusting method may be configured so that: the holding member is an assembly that is produced by welding two or more members; and both of the steps are carried out by emitting the laser beam onto regions excluding the welded portion of the holding member. If a laser beam is repeatedly emitted onto the welded portion, deformation occurs in various spots of the welded portion. As a result, the joining strength between the members might decrease, or the adjusted optical axis might return to the previous position. In the case where the holding member, excluding the welded portion, is deformed through laser irradiation, stress strain does not occur inside. Accordingly, adverse influence of temperature stress and a lapse of time can be reduced, and cracks or weld cracks can be prevented. Thus, optical axis movement due to temperature stress and a lapse of time can be restrained, and higher long-term reliability and stability can be achieved.

The optical axis adjusting method may be configured so that: the holding member is an assembly that is produced by welding two or more members; and both of the steps are carried out with a laser irradiation unit that is also used for welding the holding member. Using the same laser irradiation unit for assembling the holding member and adjusting an optical axis, the step of assembling the holding member and the steps of adjusting the optical axis can be carried out in a series of procedures. Thus, the entire process can be simplified.

The optical axis adjusting method may be configured so that: the holding member is an assembly that is produced by welding two or more members; and both of the steps are carried out with a laser irradiation unit that is different from a laser irradiation unit used for welding the holding member.

The optical axis adjusting method may be configured so that the intensity of the laser beam used in the step of roughly adjusting the optical axis is the same as or different from the intensity of the laser beam used in the step of finely adjusting the optical axis.

The optical axis adjusting method may be configured so as to further include the steps of: detecting an amount of adjustment to be made to the optical axis by irradiating the holding member with a laser beam, prior to the step of roughly adjusting the optical axis and the step of finely adjusting the optical axis; and based on the detected amount of adjustment, setting at least one of an irradiation quantity of the laser beam, an irradiation time, and an irradiation position that are to be employed in the step of roughly adjusting the optical axis and/or the step of finely adjusting the optical axis. The amount of adjustment to be made to the optical axis through laser irradiation is detected prior to actual optical axis adjustment. In this manner, the laser beam can be readily controlled in the later steps, using the detected amount as the reference amount. Thus, optical axis adjustment can be performed with high efficiency and high precision.

The optical axis adjusting method may be configured so that the amount of adjustment is detected by emitting the laser beam onto a region between the first region and the second region.

The optical axis adjusting method may be configured so as to further comprise the steps of: detecting a first amount of adjustment to be made to the optical axis by irradiating the first region with a laser beam, prior to the step of roughly adjusting the optical axis and the step of finely adjusting the optical axis; detecting a second amount of adjustment to be made to the optical axis by irradiating the second region with a laser beam, prior to the step of roughly adjusting the optical axis and the step of finely adjusting the optical axis; based on the first amount of adjustment, setting at least one of an irradiation quantity of the laser beam, an irradiation time, and an irradiation position that are to be employed in the step of roughly adjusting the optical axis; and based on the second amount of adjustment, setting at least one of an irradiation quantity of the laser beam, an irradiation time, and an irradiation position that are to be employed in the step of finely adjusting the optical axis. The amount of adjustment to be made to the optical axis through laser irradiation is detected prior to actual optical axis adjustment. In this manner, the laser beam can be readily controlled in the later steps, using the detected amount as the reference amount. Thus, optical axis adjustment can be performed with high efficiency and high precision.

The optical axis adjusting method may be configured so as to further include the steps of: detecting the amount of adjustment made to the optical axis in the step of roughly adjusting the optical axis; and based on the detected amount of adjustment, setting at least one of an irradiation quantity of the laser beam, an irradiation time, and an irradiation position that are to be employed in the step of roughly adjusting the optical axis or the step of finely adjusting the optical axis. The amount of adjustment made to the optical axis in the step of roughly adjusting the optical axis is detected, so that the laser beam can be readily controlled in the later steps, using the detected amount as the reference amount. Thus, optical axis adjustment can be performed with higher efficiency and higher precision.

The method of producing an optical module of the present invention includes the step of adjusting a tilt angle of an optical axis in two regions that are optically coupled, the step of adjusting a tilt angle being carried out by an optical axis adjusting method that includes the steps of: roughly adjusting the optical axis by irradiating a first region on the holding member with a laser beam; and finely adjusting the optical axis by irradiating a second region on the holding member with a laser beam, one of the two regions being a reference point, the first region being located closer to the reference point, and the second region being located further from the reference point. In this manner, the above described optical axis adjusting method is incorporated into the method of producing an optical module. Thus, optical modules that have optical axes adjusted with high precision can be readily and efficiently produced.

As described above, the present invention can be applied to various optical modules, regardless of the shapes and configurations of the holding members. These optical modules can perform optical axis adjustment just as well as the optical modules of the foregoing embodiments.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical axis adjusting method for adjusting a tilt angle of an optical axis in two regions that are optically coupled through a lens optical system held by a holding member having an assembly formed by welding multiple members, comprising the steps of:
    irradiating a first region of the two regions held by the holding member with a laser beam, the first region and a reference point being located on the same side of the lens optical system; and
    irradiating a second region on the holding member with a laser beam, the second region being located on the opposite side of the lens optical system from the reference point, the first region and the second region being defined as regions other than welded portions in which said welded portions are formed between the multiple members when said multiple members are configured to be welded to form the assembly for the holding member,
    one of the first region and the second region being a region in which the tilt angle of the optical axis is roughly adjusted, and the other one of the first region and the second region being a region in which the tilt angle of the optical axis is finely adjusted.

2. The optical axis adjusting method as claimed in claim 1, wherein a magnification optical system is employed as the lens optical system, and/or the lens optical system has a focal length that is longer on the side of the reference point and shorter on the side of a coupled plane, so that the first region is set as a region in which the fine adjustment is performed, and that the second region is set as a region in which the rough adjustment is performed.

3. The optical axis adjusting method as claimed in claim 1, wherein the amount of adjustment of light quantity on a coupled plane to be controlled by irradiating the first region with a laser beam is determined by whether the lens optical system is a magnification optical system or a demagnification optical system and/or the ratio of the focal length of the lens optical system on the side of the reference point to the focal length of the lens optical system on the side of the coupled plane.

4. The optical axis adjusting method as claimed in claim 1, wherein:
    the holding member is an assembly that is produced by welding two or more members; and
    the steps of irradiating the first region and the second region are carried out by emitting the laser beam onto the first region and the second region excluding the welded portions of the holding member.

5. The optical axis adjusting method as claimed in claim 1, wherein:
    the holding member is an assembly that is produced by welding two or more members; and
    the steps of irradiating the first region and the second region are carried out with a laser irradiation unit that is also used for welding the holding member.

6. The optical axis adjusting method as claimed in claim 1, wherein:
    the holding member is an assembly that is produced by welding two or more members; and
    the steps of irradiating the first region and the second region are carried out with a laser irradiation unit that is different from a laser irradiation unit used for welding the holding member.

7. The optical axis adjusting method as claimed in claim 1, wherein the intensity of the laser beam used in the step of roughly adjusting the optical axis is the same as or different from the intensity of the laser beam used in the step of finely adjusting the optical axis.

8. The optical axis adjusting method as claimed in claim 1, further comprising the steps of:

detecting an amount of adjustment to be made to the optical axis by irradiating the holding member with a laser beam, prior to the step of roughly adjusting the optical axis and the step of finely adjusting the optical axis; and based on the detected amount of adjustment, setting at least one of an irradiation quantity of the laser beam, an irradiation time, and an irradiation position that are to be employed in the step of roughly adjusting the optical axis and/or the step of finely adjusting the optical axis.

9. The optical axis adjusting method as claimed in claim 8, wherein the amount of adjustment is detected by emitting the laser beam onto a region between the first region and the second region.

10. The optical axis adjusting method as claimed in claim 1, further comprising the steps of:

detecting a first amount of adjustment to be made to the optical axis by irradiating the first region with a laser beam, prior to the step of roughly adjusting the optical axis and the step of finely adjusting the optical axis;

detecting a second amount of adjustment to be made to the optical axis by irradiating the second region with a laser beam, prior to the step of roughly adjusting the optical axis and the step of finely adjusting the optical axis;

based on the first amount of adjustment, setting at least one of an irradiation quantity of the laser beam, an irradiation time, and an irradiation position that are to be employed in the step of roughly adjusting the optical axis; and based on the second amount of adjustment, setting at least one of an irradiation quantity of the laser beam, an irradiation time, and an irradiation position that are to be employed in the step of finely adjusting the optical axis.

11. The optical axis adjusting method as claimed in claim 1, further comprising the steps of:

detecting the amount of adjustment made to the optical axis in the step of roughly adjusting the optical axis; and based on the detected amount of adjustment, setting at least one of an irradiation quantity of the laser beam, an irradiation time, and an irradiation position that are to be employed in the step of roughly adjusting the optical axis or the step of finely adjusting the optical axis.

12. A method of producing an optical module comprising the step of adjusting a tilt angle of an optical axis in two regions that are optically coupled through a lens optical system held by a holding member having an assembly formed by welding multiple members, the step of adjusting comprising the steps of:

irradiating a first region of the two regions held by the holding member with a laser beam, the first region and a reference point being located on the same side of the lens optical system; and irradiating a second region on the holding member with a laser beam, the second region being located on the opposite side of the lens optical system from the reference point, the first region and the second region being defined as regions other than welded portions in which said welded portions are formed between the multiple members when said multiple members are configured to be welded to form the assembly for the holding member, one of the first region and the second region being a region in which the tilt angle of the optical axis is roughly adjusted, and the other one of the first region and the second region being a region in which the tilt angle of the optical axis is finely adjusted.

* * * * *